Figure 3:
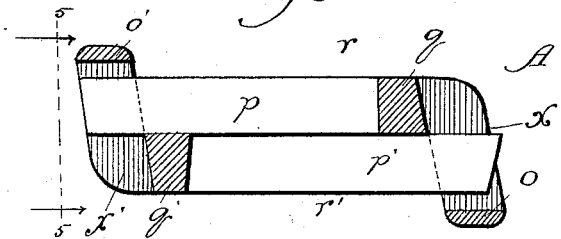

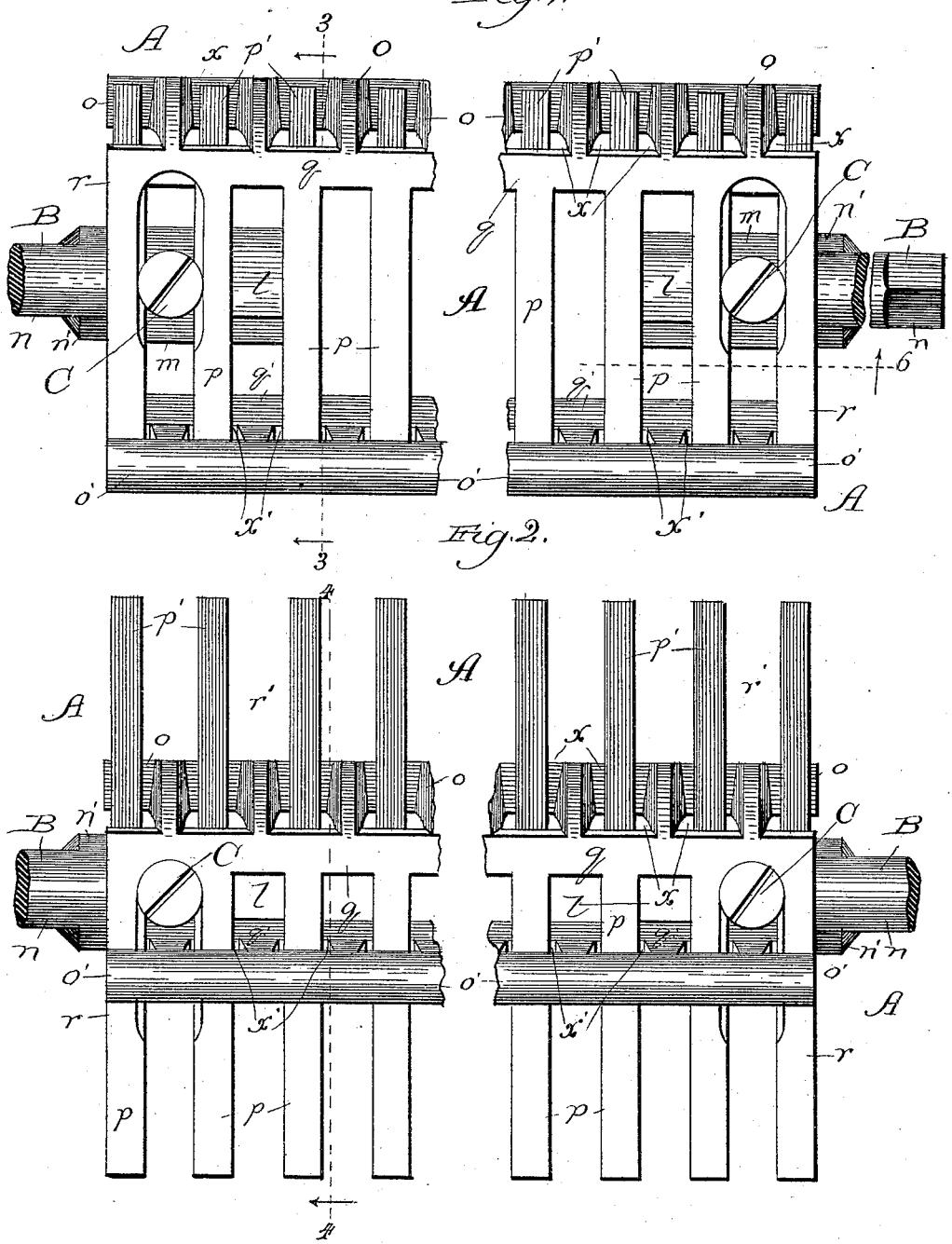

(No Model.) 4 Sheets—Sheet 2.

J. W. KEYES.
GRATE.

No. 395,397. Patented Jan. 1, 1889.

Witnesses:
Chas. E. Gaylord.
J. H. Dyrenforth.

Inventor:
John W. Keyes.
By Dyrenforth & Dyrenforth
Attys.

(No Model.) 4 Sheets—Sheet 3.

J. W. KEYES.
GRATE.

No. 395,397. Patented Jan. 1, 1889.

Witnesses:
Chas. E. Gaylord.
J. W. Dyrenforth.

Inventor:
John W. Keyes,
By Dyrenforth & Dyrenforth
Attys.

N. PETERS, Photo-Lithographer, Washington, D. C.

(No Model.) 4 Sheets—Sheet 4.
J. W. KEYES.
GRATE.
No. 395,397. Patented Jan. 1, 1889.
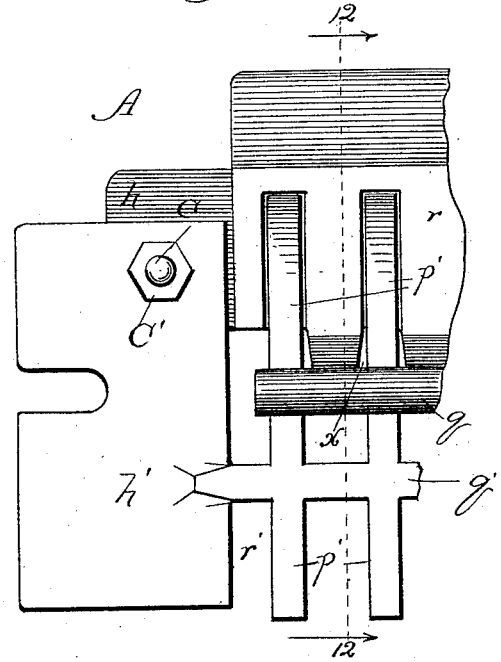
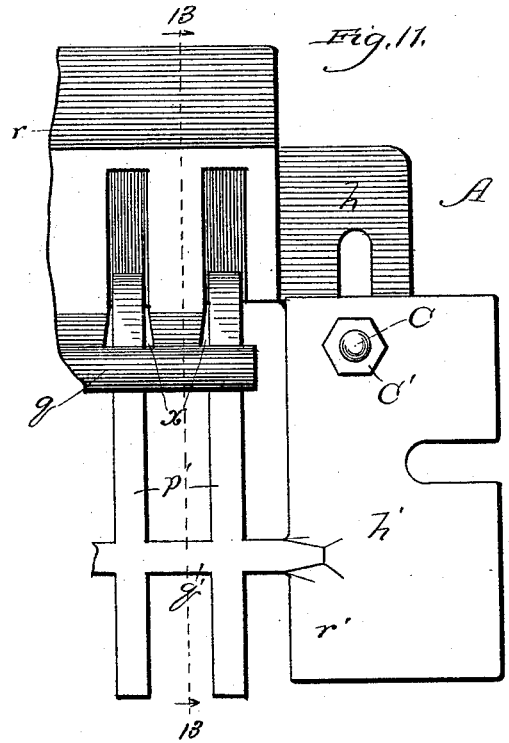
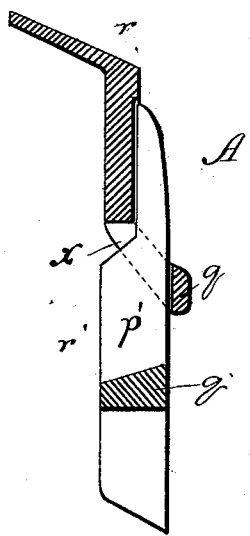
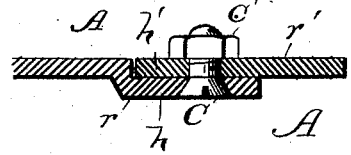
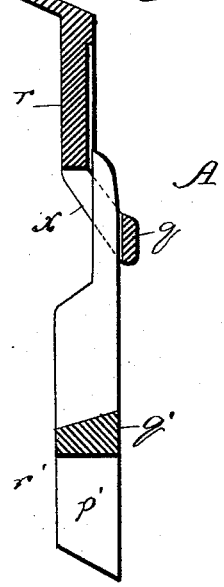
Witnesses:
Chas. E. Gaylord.
J. W. Dyrenforth.
Inventor:
John W. Keyes,
By Dyrenforth & Dyrenforth
Attys.

UNITED STATES PATENT OFFICE.

JOHN W. KEYES, OF PANA, ILLINOIS.

GRATE.

SPECIFICATION forming part of Letters Patent No. 395,397, dated January 1, 1889.

Application filed January 24, 1888. Serial No. 261,742. (No model.)

*To all whom it may concern:*

Be it known that I, JOHN W. KEYES, a citizen of the United States, residing at Pana, in the county of Christian and State of Illinois, have invented a new and useful Improvement in Grates, of which the following is a specification.

My invention relates particularly to an improvement in the grates used in stoves, and more especially in cook-stoves, though the grates of other kinds of stoves, furnaces, and fire-places may also be constructed in accordance with my improvement with attendant advantages.

My object is to provide a construction of grate which shall render it readily adaptable to stoves of different sizes, and thereby obviate the necessity on the part of dealers to carry stocks of the various sizes of grates suitable for all the varieties and sizes of stoves sold by them, and at the same time insure to users the convenience of being able without delay to supply themselves with grates from the dealers, instead of being obliged, as is frequently the case, to order them from the manufacturers, who may or may not have them in stock, and who, if the latter, have to manufacture them to supply the orders, thereby entailing great and annoying delay.

It is also my object to afford by my improved construction a grate which shall be at least as durable as any other grate hitherto used and formed in a single piece—that is to say, my improvement will not render grates any the less durable by reason of its construction, but, on the contrary, will tend rather to make them stronger and better.

My invention consists in the general construction of my improved transversely extensible and folding grate; and it further consists in details of construction and combinations of parts, all as hereinafter more fully set forth.

My improvement is applicable with equally good effect to the construction of grates for the bases or bottoms as well as the fronts of fire-chambers, and I accordingly illustrate it in one of each kind of bottom and front grates in the drawings, in which—

Figure 4:
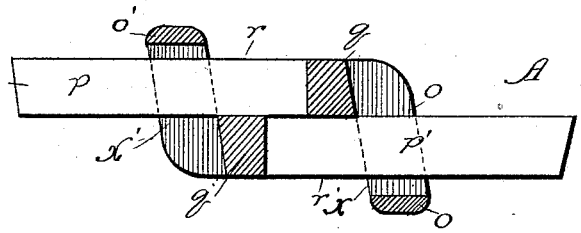
Figure 5:
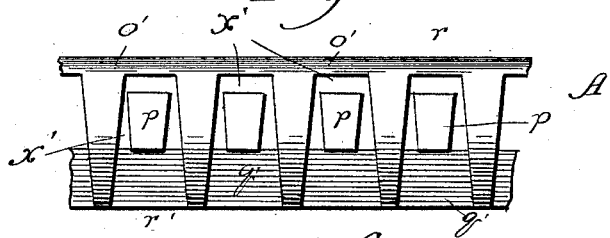
Figure 6:
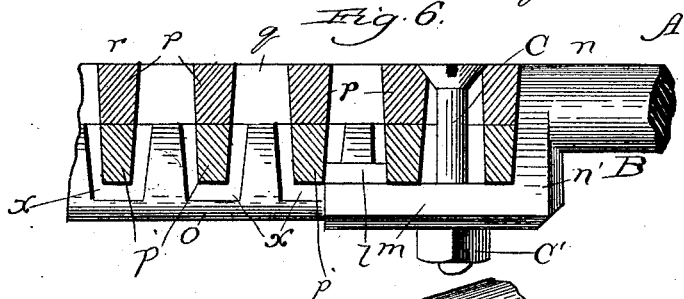
Figure 7:
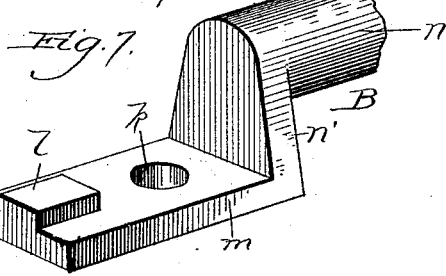
Figure 8:
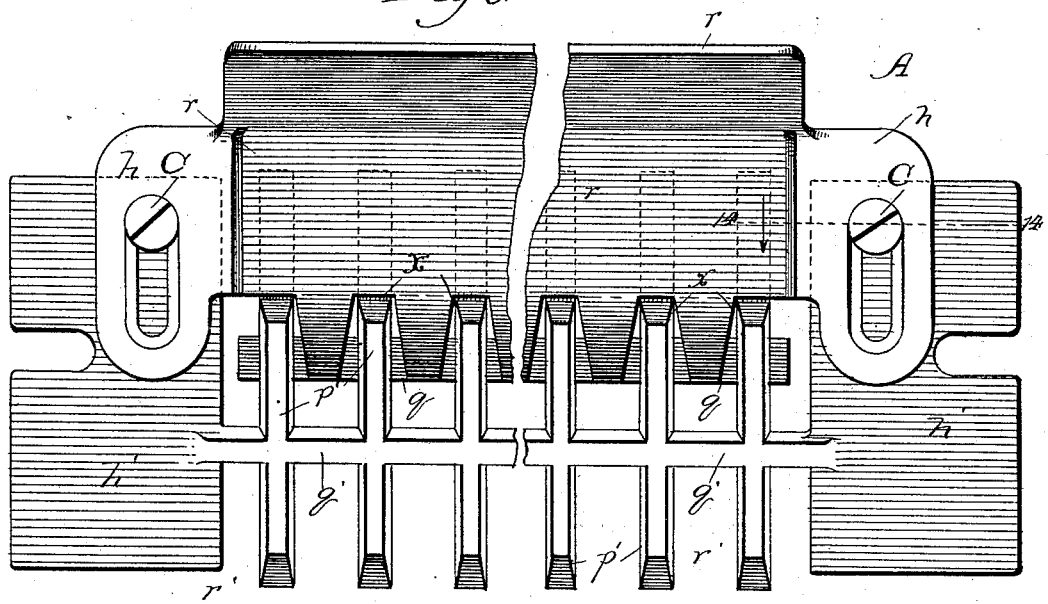
Figure 9:
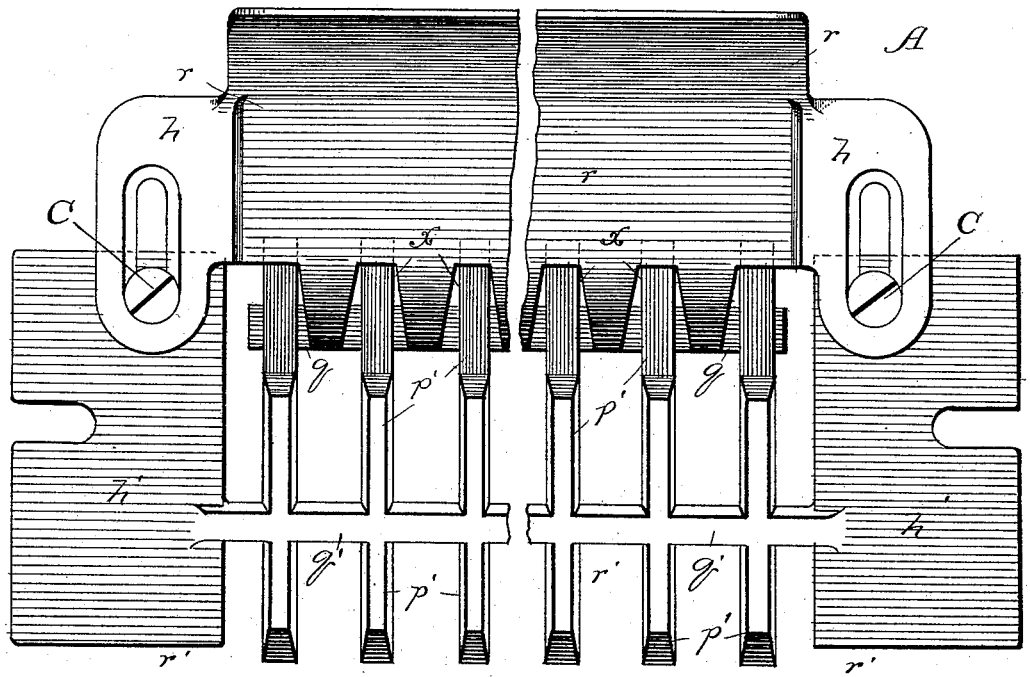

Figure 1 is a broken plan view of my improved bottom grate folded transversely to its smallest dimensions; Fig. 2, a similar view of the same extended transversely to its full limit; Fig. 3, a section taken on the line 3 3 of Fig. 1 and viewed in the direction of the arrows; Fig. 4, a section taken on the line 4 4 of Fig. 2 and viewed in the direction of the arrows; Fig. 5, a view in the direction of the arrows from the line 5 5 of Fig. 3; Fig. 6, a section taken on the line 6 of Fig. 1 and viewed in the direction of the arrow; Fig. 7, a broken perspective view of the combined journal and clamp used at each end of the bottom grate; Fig. 8, a broken front view of the front grate of my improved construction folded transversely to its smallest dimensions; Fig. 9, a similar view of the same extended transversely to its full limit; Fig. 10, a rear view of the portion of the grate shown at the right of Fig. 8; Fig. 11, a similar view of the portion of the grate shown at the left of Fig. 9; Fig. 12, a section taken on the line 12 12 of Fig. 10 and viewed in the direction of the arrows; Fig. 13, a section taken on the line 13 13 of Fig. 11 and viewed in the direction of the arrows, and Fig. 14 a section taken on the line 14 14 of Fig. 8 and viewed in the direction of the arrows.

A is a grate formed, as to the "bottom-grate" kind, of two exact counterparts, $r$ and $r'$, and, as to the "front-grate" kind, of two counterparts, $r$ and $r'$, substantially alike.

For convenience I describe the construction of each kind of grate separately, and first that of the bottom grate. The part $r$ comprises a longitudinal bar, $q$, having transverse fingers $p$ extending from one side thereof the desired distance apart, and the opposite side of the bar $q$ is provided with a flange or head, $o$, having an opening, $x$, in line with each transverse finger, for a purpose hereinafter described. The part $r'$ comprises a longitudinal bar, $q'$, having transverse fingers $p'$ extending from one side thereof the desired distance apart, and the opposite side of the bar $q'$ is provided with a flange or head, $o'$, having an opening, $x'$, in line with each transverse finger, for a purpose hereinafter described.

The two parts $r$ and $r'$, when adjusted together, form my improved folding and extensible bottom grate, the adjustment of the parts being accomplished as follows: The part $r$ is inverted or turned to cause the flange $o$ to extend downward and imposed upon the part $r'$ to cause the transverse fingers on both to coincide and those on the part $r$ to extend at their extremities into the openings $x'$ in the flange or head $o'$ of the part $r'$ and those on the part $r'$ to extend into the openings $x$ in the flange or head $o$ of the part $r$. When so adjusted, the two parts $r$ and $r'$ may be slid transversely one upon the other to cause the extremities of the transverse fingers of each to extend beyond the head or flange of the other, as shown in Fig. 2, or to cause them to coincide throughout, thereby folding the parts of the grate to reduce it transversely.

Whatever the position with reference to each other to which the parts $r$ and $r'$ are adjusted, they are held by clamps forming parts of the journals B, one at each end. The journal B (shown most clearly in Fig. 7) comprises the part $n$, or journal proper, vertical part $n'$, and horizontal plate or bearing $m$, connected with the part $n$ by the vertical part $n'$, and provided near its extremity on its upper surface with a lug, $l$, and near its center with an opening, $k$.

When the parts $r$ and $r'$ are adjusted together as described, the device B is applied at each end by adjusting the horizontal plate $m$ underneath the grate lengthwise of the same to bring the lug $l$ between two fingers, $p'$, and the opening $k$ between two fingers nearer to the extremity of the grate, when a screw or bolt, C, is dropped through the opening $k$ from the top of the grate or part $r$ between the fingers bordering the opening $k$, and is secured in position by means of a nut, C'. The lug $l$ serves to prevent longitudinal play of the parts of the grate one upon the other. If desired, the fingers $p$, between which the screws C are inserted, may be recessed on their inner edges, as shown, to afford seats for the screw-heads.

It will thus be seen that the parts $r$ and $r'$ of the grate may upon loosening the clamps be readily adjusted to extend or fold them transversely, and that, when adjusted as desired, they are firmly held by tightening the nuts C'.

The difference in construction of the bottom grate thus described from the front grate is, first, that the transverse fingers $p'$ on the longitudinal bar $q'$ of the part $r'$ extend across the bar shown, thereby rendering fingers $p$ on the part $r$ unnecessary, and no head $o'$ is required; secondly, that the end bearings are in the form of plates $h'$, slotted at their lateral edges, as shown, (to fit over lugs on the opposite sides of the opening to the front of the stove,) and provided with holes to receive the screws or bolts C, and, thirdly, that the head $o$ is curved and extended and provided with slotted ears $h$. Otherwise there is no material difference between the two forms of my improved extensible and folding grate.

To adjust together the two parts $r$ and $r'$ of the front grate, the former is imposed upon the latter to cause the fingers $p'$ to extend in line with the openings in the head $o$ and through the latter, and the clamping is effected by the screws or bolts C, tightened by means of the nuts C'.

What I claim as new, and desire to secure by Letters Patent, is—

1. In a transversely extensible and folding grate, the combination of a part, $r$, having a longitudinal bar, $q$, and a head provided with openings $x$, and a part, $r'$, having a longitudinal bar, $q'$, carrying transverse fingers $p'$, extending through the openings $x$, and means, substantially as described, for clamping together the parts $r$ and $r'$ and supporting the grate, substantially as set forth.

2. A grate formed in two parts, $r$ and $r'$, adjusted together to adapt them to be extended and folded transversely with reference to each other, in combination with a journal device, B, for supporting the grate at each end and clamping the parts $r$ and $r'$ together, comprising a journal, $n$, and a bearing, $m$, connected with the journal and provided with a lug, $l$, and means, substantially as described, for securing the device B in place, substantially as set forth.

3. A grate formed in two parts, $r$ and $r'$, adjusted together to adapt them to be extended and folded transversely with reference to each other, in combination with a journal device, B, for supporting the parts $r$ and $r'$ together, comprising a journal, $n$, a bearing, $m$, connected with the journal and provided with a lug, $l$, and an opening, $k$, and a bolt and nut, C C', substantially as described.

4. In a transversely extensible and folding grate, the combination of a part, $r$, having a longitudinal bar, $q$, carrying transverse fingers $p$, and provided with a head, $o$, having openings coincident with the said fingers $p$, a longitudinal bar, $q'$, carrying transverse fingers $p'$, and provided with a head, $o'$, having openings coincident with the said fingers $p'$, and means, substantially as described, for clamping the parts $r$ and $r'$ together and supporting the grate, substantially as set forth.

5. In a transversely extensible and folding grate, the combination of a part, $r$, having a longitudinal bar, $q$, carrying transverse fingers $p$, a part, $r'$, having a longitudinal bar, $q'$, carrying transverse fingers $p'$, a combined clamp and journal, B, at each end, comprising the parts $n$ and $n'$, and the bearing $m$, having a lug, $l$, and opening $k'$, and a bolt, C, and nut C', substantially as and for the purpose set forth.

JOHN W. KEYES.

In presence of—
G. I. LADD,
E. S. DORIS.